(12) United States Patent
Gorelik

(10) Patent No.: US 10,860,897 B2
(45) Date of Patent: Dec. 8, 2020

(54) PATTERN RECOGNITION WITH AI MAPS

(71) Applicant: Victor Gorelik, Brooklyn, NY (US)

(72) Inventor: Victor Gorelik, Brooklyn, NY (US)

(*) Notice: Subject to any disclaimer, the term of this patent is extended or adjusted under 35 U.S.C. 154(b) by 53 days.

(21) Appl. No.: 16/260,231

(22) Filed: Jan. 29, 2019

(65) Prior Publication Data

US 2020/0242418 A1   Jul. 30, 2020

(51) Int. Cl.
*G06K 9/62* (2006.01)
*G06K 9/00* (2006.01)
*G06T 7/13* (2017.01)

(52) U.S. Cl.
CPC ....... *G06K 9/6276* (2013.01); *G06K 9/00342* (2013.01); *G06K 9/6232* (2013.01); *G06K 9/6256* (2013.01); *G06K 9/6289* (2013.01); *G06T 7/13* (2017.01); *G06T 2207/10016* (2013.01); *G06T 2207/10028* (2013.01); *G06T 2207/20081* (2013.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 5,255,354 A | * | 10/1993 | Mahoney | G06K 9/4638 345/428 |
| 5,416,851 A | * | 5/1995 | Huttenlocher | G06K 9/50 382/196 |
| 5,835,634 A | * | 11/1998 | Abrams | G06K 9/6202 382/222 |
| 2008/0181459 A1 | * | 7/2008 | Martin | G06K 9/00355 382/103 |
| 2012/0002865 A1 | * | 1/2012 | Malmberg | G06K 9/342 382/154 |
| 2012/0109597 A1 | * | 5/2012 | Derfoul | E21B 43/00 703/2 |
| 2014/0270436 A1 | * | 9/2014 | Dascal | A61B 6/487 382/130 |

OTHER PUBLICATIONS

Shah, S.K.—"Design and Implementation of Optical Character Recognition System to Recognize Gujarati Script using Template Matching"—IE(I) Journal—2006—pp. 44-49 (Year: 2006).*
Brown, L.R.—"The Fringe Distance Measure: An Easily Calculated Image Distance Measure with Recognition Results Comparable to Gaussian Blurring"—IEEE 1994—pp. 111-115 (Year: 1994).*

* cited by examiner

*Primary Examiner* — Bernard Krasnic

(57) ABSTRACT

The invention provides a device and a method for classification of static and dynamic black-and-white images K pixels by L pixels based on using AI maps calculated for each image of a training set of images. Each AI map is a K by L matrix where each cell of the matrix contains a number equal to the distance from the pixel corresponding to this cell to the pixel's nearest black pixel in the image. In case of recognition of a moving person, an image is composed of N frames (considered as a single image) of a video recorded while the person makes 2 steps and the video recording rate (the number of frames recorded per second) is proportional to the speed of the person.

1 Claim, 4 Drawing Sheets a)

b)

```
2421: (39, 30)
2425: (43, 24) (45, 20) (48, 11)
2426: (49, 5)
2434: (47, 15)
2437: (49, 6)
2440: (42, 26) (46, 18)
2441: (40, 29)
```

PATTERN RECOGNITION WITH AI MAPS

CROSS REFERENCE TO RELATED APPLICATIONS

Not applicable.

STATEMENT REGARDING FEDERALLY SPONSORED RESEARCH AND DEVELOPMENT

Not applicable.

REFERENCE TO SEQUENCE LISTING, A TABLE, OR A COMPUTER PROGRAM LISTING COMPACT DISC APPENDIX

Not applicable.

TECHNICAL FIELD

This invention relates to artificial intelligence (AI).

BACKGROUND

There are different methods of pattern recognition, for example, based on artificial neural networks (ANN).

Many important problems, including the classical problem of pattern recognition—handwritten digit recognition, can be solved by ANN with good accuracy.

The drawback of using ANN is the necessity of optimization procedures on training data sets, which is slow and does not guarantee the best result. For recognition of complex dynamic patterns, like recognition of a person by LIDAR videos of him, both performance and accuracy of recognition are extremely important.

SUMMARY

It is therefore the objective of the present invention to provide a device and a method for recognition/classification of static images (e.g., digits) and dynamic images (e.g. LIDAR videos) with a high performance and a high level of accuracy.

The proposed device is comprised of an optical device for recording static or dynamic images, e.g., a photo camera or a LIDAR system.

The proposed method is based on comparison of an image/video that is to be classified with AI maps (we introduce this notion below) calculated from a training set of images/videos.

DETAILED DESCRIPTION OF THE INVENTION

Figure 1:
FIG. 1 illustrates 60,000 MNIST training images.

FIG. 1 illustrates 60,000 MNIST training images.
Each training image is an image (28 pixels by 28 pixels) of a scanned handwritten digit, and the color of each pixel of the image is gray. In the current patent application, all gray pixels are considered as black.

Figure 2:
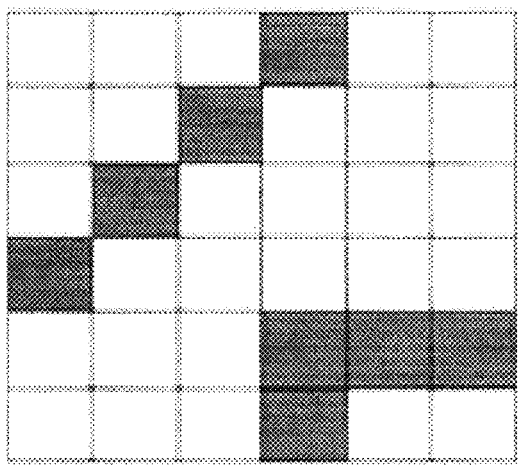
FIG. 2 illustrates an AI map 6 cells by 6 cells.

FIG. 2 illustrates creating an AI map 6 cells by 6 cells of an image. A black-and-white image is shown in FIG. 2 on the left, and the AI map of the image is the matrix shown in FIG. 2 on the right. Instead of each pixel of the image, we put in the corresponding cell of the AI map a number that is equal to the distance from the pixel to its nearest black pixel in the image. Similarly, the AI map of each of 60,000 training images is a matrix 28 cells by 28 cells, where each cell of the matrix contains a number that is equal to the distance from the pixel corresponding to this cell to the pixel's nearest black pixel in the image.

Figure 3:
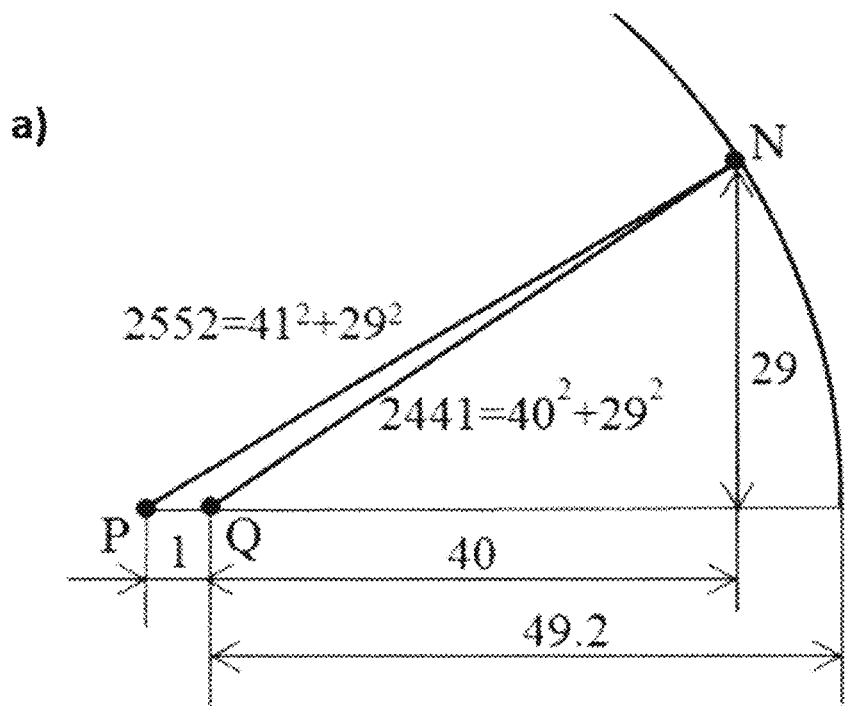
FIG. 3 illustrates how fill an AI map using the proposed method.

FIG. 3 and the following 4 paragraphs illustrate the proposed method of filling an AI map.

If P is a black pixel in an image (FIG. 3 (*a*)), then this pixel is replaced by zero. The very next pixel Q (1 pixel to the right from P) is replaced by 1 for white Q or by zero for black Q.

If P is a white pixel and N is its nearest black pixel, let us draw through N a circle with the center in P, see FIG. 3 (*a*).

Suppose that the difference between the x-coordinates of pixels P and N is equal to 41 and between the y-coordinates—to 29, see FIG. 3 (*a*). The square of the distance PN is equal to $r^2=41^2+29^2=2522$, so the number $r=\sqrt{2522}$ goes into a corresponding 2D array in place of pixel P.

Now let us figure out the number that has to be in the 2D array instead of pixel Q located at the distance of 1 pixel to the right from P. In this case, pixel Q is white because if Q were black, then Q (not N) would be the nearest black pixel for P. The square of this number cannot be greater than $2441=(41-1)^2+29^2$ because if it were greater than 2441, then N would be the nearest black pixel to Q and 2441 would be added in the array instead of Q. At the same time, by the reason that N is the black pixel closest to P, there are no black pixels inside of the circle, so the square of this number cannot be less than $(r-1)^2=(\sqrt{2522}-1)^2=49.2^2=2422.6$.

The integer numbers in this range (from 2423 to 2441) each of which can be presented as a sum of two squares are shown in FIG. 3 (*b*). For example, $2440=42^2+26^2=46^2+18^2$. If pixel Q has the coordinates (x, y), we need to check if there is a black pixel in the locations (x+43, y+24), (x+24, y+43), (x+24, y−43) ..., and (x+46, y−18). If it is found in one of these locations, we put the square root of the corresponding number: 2425, 2426, 2434, 2437, or 2440 in the 2D array in place of pixel Q. If a black pixel is not found, it means pixel N is the nearest to pixel Q, and we put in the 2D array the number $\sqrt{2441}$ Starting from the very left top pixel (as pixel P) in the image, then moving from pixel to pixel with a step of 1 to the right until the edge of the image, then down, then to the left, and so on and performing on each move calculations similar to the described above, we fill the entire 2D array.

To classify 10,000 MNIST test images, we compare each of them against each of 60,000 training AI maps and calculate 10,000*60,000 distances.

To calculate the distance between a test image and a training image, we overlap the testing image over the training map of the training image. Each black pixel of the testing image will get into a cell of the training map. The number in this cell is the distance from the pixel of the testing image to the nearest black pixel in the training image (a constant complexity algorithm). The average of all these distances over all black pixels of the testing image is our definition of the distance between the testing image and the training image (linear complexity).

For each testing image we calculate 60,000 distances to each of training images. One of these images, let us say—to image of digit i—is minimum. Then we classify the testing image as image if digit i. If testing image represents image i, our classification is correct, if not—wrong.

Figure 4:
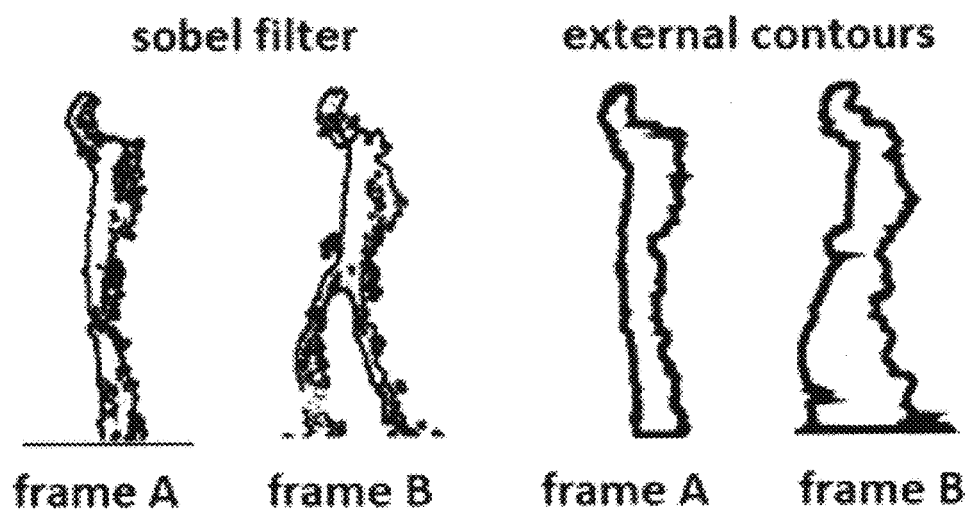
FIG. 4 illustrates specifics of recognition of dynamic images.

FIG. 4 illustrates specifics of recognition of dynamic images: removing background, converting of colored image into the gray one, sobel filtering, and extracting of external counter of an image. All these operations are well known and can be implemented, e.g., in MATLAB.

The subject of the current invention is synchronization of the images. We compare not one image against another image (as in the case of digits classification above), but a sequence of N images against another sequence of N images (N frames of surveillance video). We consider all N frames as a single image comprising N parts. It is important to synchronize videos so than a part of image with legs apart would not be compared against a part of image with legs together, see FIG. 4.

We assume that each person has several different styles of movements (walking, fast walking, sport walking, running . . . ) and that inside of one style the person can move faster or slower but repeats the same motion pattern of this style. In other words, if you have two videos—one where the person walks normally and second—where the same person walks the same distance but 10% faster, and the second video was recorded with 10% higher rate of frames per second, then these videos have the same number of frames and the same number of frames per one step (35 in the example above). Moreover, if the videos start from the same position (e.g., the position with maximum distance between feet, it is absolutely the same video.

In our method, all templet videos for different persons are recorded so that $F1/v1=const1$, where F1 is the rate of the templet video (frames per second) and v1 is the speed of the person. The speed of the person is measured with the same LIDAR, and the recording rate and the start of recording are adjusted automatically. All surveillance videos are also recorded so that $F2/v2=const1$, where F2 is the rate of the surveillance video and v2 is the speed of the person under surveillance. As a result, $F2/v2=const1=F1/v1$ and $F2=F1*v2/v1$. It means that the templet and the surveillance videos of the same person moving in the same style should coincide no matter of the person's speed (because the videos start from the same position).

The advantages of the proposed method are as follows: high accuracy; high performance; simplicity.

The invention claimed is:

1. A method for classification of images comprising
recording images of a person, wherein a recording rate F1 (frames per second) of the recording is adjusted automatically based on a speed v1 of the person so that $F1/v1=const1$, wherein const1 is a real constant value;
comparing and synchronizing a sequence of N images from the recorded images while the person makes two steps against a sequence of N images of a surveillance video recorded with a recording rate F2 (frames per second) while a person with a speed v2 under surveillance makes two steps, wherein N is an integer number and $F2/v2=const1=F1/v1$, by:
converting the recorded images to black-and-white images of a size K pixels by L pixels;
creating a training set of M training images from the converted images where each training image is labeled as belonging to one class of images, and K, L, and M are integer numbers;
calculating for each training image of the training set an Artificial Intelligence (AI) map that is a K by L matrix where each cell of the matrix contains a number equal to a distance from the pixel corresponding to this cell to the pixel's nearest black pixel of the training image, and each of the distances are calculated based on the Pythagorean theorem (distance=sqrt{[x-coordinate difference between the pixel corresponding to this cell and the pixel's nearest black pixel]$^2$+[y-coordinate difference between the pixel corresponding to this cell and the pixel's nearest black pixel]$^2$}) combined with the fact that the pixels' coordinates are integer numbers;
finding in the training set of training images such an image (image A) that a distance from image A to a surveillance image that is to be classified (image B) is minimum, where the distance from image A to the surveillance image (image B) is defined as an average of the distances in those cells in the AI map of image A that correspond to black pixels in the surveillance image (image B);
classifying the surveillance image (image B) as belonging to the same class as image A.

* * * * *